I. T. SUGGS.
Seed-Planters.
No. 138,105.  Patented April 22, 1873.
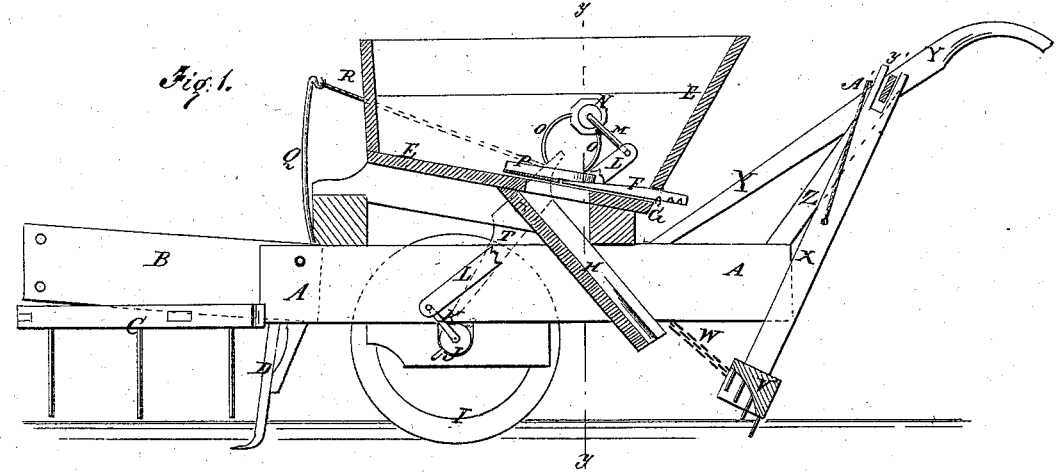
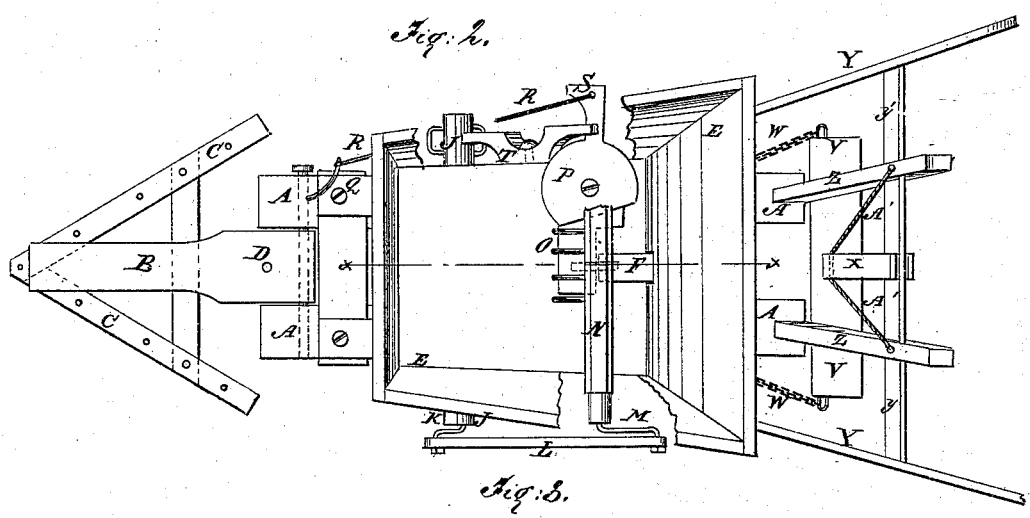
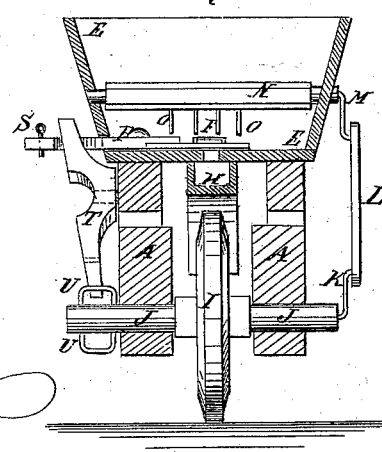

UNITED STATES PATENT OFFICE.

ISAAC T. SUGGS, OF GREENE HILL, TEXAS.

IMPROVEMENT IN SEED-PLANTERS.

Specification forming part of Letters Patent No. 138,105, dated April 22, 1873; application filed November 25, 1872.

*To all whom it may concern:*

Be it known that I, ISAAC T. SUGGS, of Greene Hill, in the county of Titus and State of Texas, have invented a new and useful Improvement in Seed-Planter, of which the following is a specification:

Figure 1 is a vertical longitudinal section of my improved seed-planter taken through the line *x x*, Fig. 2. Fig. 2 is a top view of the same, parts being broken away to show the construction. Fig. 3 is a vertical cross-section taken through the line *y y*, Fig. 1.

Similar letters of reference indicate corresponding parts.

The invention consists in the improvement of seed-planters, as hereinafter described and claimed.

A is the main frame of the machine, to and between the forward ends of which is pivoted the rear end of the short beam B, to the forward end of which the draft is applied. The beam B is made thick, as shown in Fig. 1, so that two or more holes may be formed in its forward end to receive the draft-clevis. By this means, by adjusting the draft-clevis higher or lower the harrow may be made to work deeper or shallower in the ground, as may be desired. To the under side of the beam B is secured a small triangular or V-shaped harrow, C, to remove clods, stalks, and other obstructions, and to loosen up the soil to better prepare it for the opener and cover. D is the opener, which is attached to the rear part of the beam B, and which rests against a shoulder or arm formed upon or attached to the rear end of the said beam B. In very loose soil the opener D need not be used. E is the seed-hopper, the bottom of which, or the frame upon which said hopper rests, inclines to the rearward so that the seed may slide back into the rear part of the hopper, where the discharge-opening is formed. The size of the discharge-opening is regulated by a slide, F, that passes in through a slot in the rear side of the hopper E, and which is held in any position into which it may be adjusted by a spring, G, attached to the hopper E, and which enters notches formed in the rear part of the slide F. To the bottom of the hopper E, or to the frame-work of the machine, is secured a spout, H, to receive the seed from the discharge-opening of the hopper E, and conduct it into the furrow opened to receive it. The upper side of the spout H is left open, so that the plowman can always see whether the seed is being dropped properly. I is a wheel placed between the opener D and spout H, and which has the side edges of its face beveled off, as shown in Fig. 3, so that it may press back and pack the sides of the furrow opened by the opener D, to keep its sides from falling in before the seeds have been placed in it. The wheel I is attached to a shaft, J, the journals of which revolve in bearings in the frame A. To the projecting end of one of the journals of the shaft J is attached a short crank, K, to which is pivoted the lower end of the connecting-rod L, the upper end of which is pivoted to a crank, M, attached to the projecting end of the shaft N, which works in bearings in the sides of the hopper E. The crank M is made longer than the crank K, so that a revolution of the wheel I will only rock the shaft N. To the shaft N, within the hopper E, are attached two sets of teeth, O, as shown in the drawing, the forward set being curved to the rearward, and the rear set being curved forward, as shown in Fig. 1. The teeth O are designed to move the cotton-seed to the discharge-opening, and to keep cotton or other seed stirred up so that it may not become clogged and may pass out freely through said discharge-opening. P is a valve or plate, which passes through a slot in the side of the hopper E, and rests upon and is pivoted to the bottom of said hopper. The valve P is so formed that it will cover and uncover the discharge-opening of the hopper E by being moved upon its pivoting-point. The valve P is held in position to cover the discharge-opening of the hopper E by the spring Q, the lower end of which is attached to the forward part of the frame A, and to its upper end is attached one end of a cord, R. The other end of the cord R has a hook or pin, S, attached to it, which is inserted in a hole in the outer end of the valve P. T is a lever, which is pivoted to the frame-work of the machine in such a position that its upper end may rest against the forward side of the projecting part of the valve P, and its lower end may be in such a position as to be struck by the cams or stops U, attached to the end of the shaft J of the wheel I, so that as the machine is drawn forward the cams or stops U may operate the lever T and valve P to uncover the discharge-opening of the hopper E. When it is desired that the valve P should not operate, the hook or pin S is detached from the outer end of the valve P, and is inserted in a hole in the lower part of the lever T, so that the spring Q may hold the lever T away from the cams or stops U, the said lever T at the same time holding the valve P away from the discharge-opening of the hopper E. The seed will be dropped at each revolution of the wheel I as many times as there are cams or stops U attached to the shaft J. V is the covering-block, the under side of which is concaved to push the dirt into the furrow and give proper form to the top of the ridge, and is provided with teeth to loosen up the dirt and push off any clods or other rubbish that might otherwise cover the seeds and obstruct the growth of the plants. To the ends of the covering-block V are attached the ends of the chains W, the other ends of which are attached to the rear part of the frame A. To the middle part of the covering-block V is attached an upright, X, the upper end of which is slotted to receive the round $y'$ of the handles Y. The lower ends of the handles Y are attached to the frame A, and they are supported by the standards Z, the lower ends of which are attached to the rear end of the frame A, and their upper ends are attached to the round $y'$. To the standard X are attached the lower ends of the cords or chains A', the upper ends of which are attached to the standards Z, so that the pressure of the coverer V may be regulated as required.

Having thus described my invention, I claim as new and desire to secure by Letters Patent—

A harrow, C, combined with a beam, B, pivoted at its rear end to the front of a seed-planter, as and for the purpose described.

ISAAC T. SUGGS.

Witnesses:
    H. S. SUGGS,
    R. S. PARSONS.